Figures 3, 4:
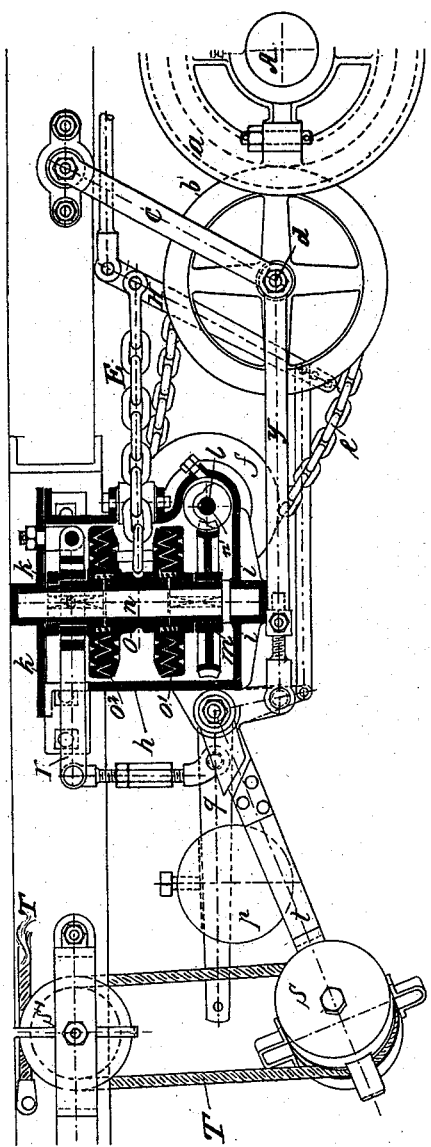

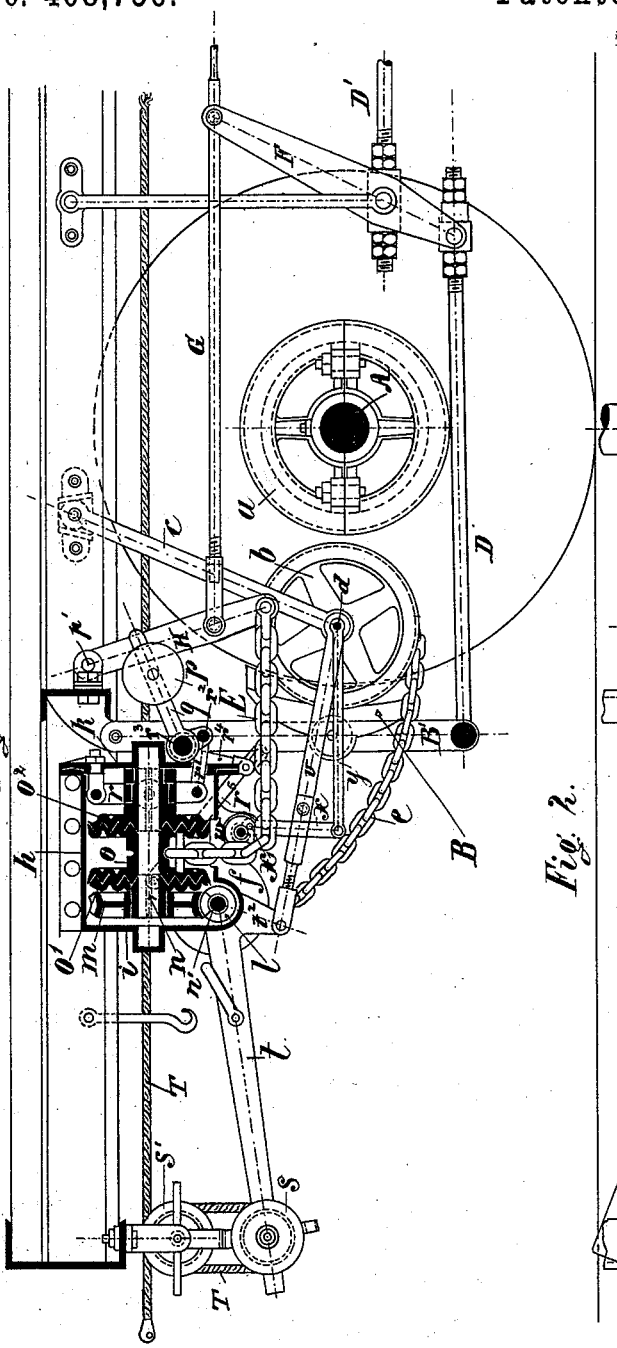

(No Model.) 2 Sheets—Sheet 2.

W. SCHMID.
BRAKE.

No. 408,756. Patented Aug. 13, 1889.

Witnesses.

Inventor.

UNITED STATES PATENT OFFICE.

WOLFGANG SCHMID, OF MUNICH, BAVARIA, GERMANY.

BRAKE.

SPECIFICATION forming part of Letters Patent No. 408,756, dated August 13, 1889.

Application filed March 15, 1889. Serial No. 303,441. (No model.) Patented in Germany August 26, 1884, No. 32,465; in Belgium February 15, 1886, No. 71,731; in Italy March 6, 1886, No. 19,418; in France May 3, 1886, No. 173,681, and in England December 13, 1888, No. 18,237.

*To all whom it may concern:*

Be it known that I, WOLFGANG SCHMID, of Munich, in the Kingdom of Bavaria, Germany, have invented an Improved Brake, (for which I have obtained the following patents: Germany, No. 32,465, dated August 26, 1884; Italy, No. 19,418, dated March 6, 1886; France, No. 173,681, dated May 3, 1886; England, No. 18,237, dated December 13, 1888; Belgium, No. 71,731, dated February 15, 1886,) of which the following is a specification.

The nature of my invention consists of the various improvements hereinafter fully described and claimed.

In the accompanying drawings, Figure 1 is an elevation of my improved brake, partly in section; and Fig. 2 is a plan of the same. Fig. 3 is an elevation of my brake, showing some modifications; and Fig. 4, a plan of the same.

To one of the axles A of the car a wheel $a$ is firmly attached, provided with a groove into which an adjoining wheel $b$ is made to work by friction. This wheel $b$ is arranged to receive an endless chain $e$. The spindle $d$ of this wheel $b$ is suspended in the ends of levers $c$, attached to the body of the car, and is connected through lever $y$ with a link vibrating on a center $x$, attached to a case $h$. To the body of the car the case $h$ is attached, supporting in its ends or heads $i$ $k$ a shaft $n$. This shaft $n$ supports a wheel $o'$, firmly attached to the shaft, the double wheel $o$, running loosely upon said shaft, and a wheel $o^2$, arranged to slide back and forth upon a key or feather attached to this shaft $n$. The adjoining surfaces of the wheels $o'$ $o$ $o^2$ are arranged with circular grooves meshing into each other, so that when pressed against each other the friction of the same will connect the wheels firmly together. In the hubs between the wheels $o'$ and $o$ a spring may be arranged to force the surfaces of these wheels slightly apart whenever the wheel $o^2$ is moved away from $o$, as shown in Fig. 3.

In the lower part of the case $h$ a shaft $n'$ is arranged at right angles to the shaft $n$, carrying a worm $l$, meshing into the worm-wheel $m$, firmly attached to the hub of the wheel $o'$.

On the outer end of this shaft $n'$ a chain-wheel $f$ is attached, over which the endless chain $e$ passes, thus connecting this wheel $f$ with the wheel $b$.

To the hub of the wheel $o^2$ a fork $r$ is fitted, connected through rod $r'$ with lever $r^2$, attached to a shaft $r^3$, arranged on the outside of the case $h$. This shaft $r^3$ carries the lever $q$, provided with a heavy weight $p$. The end of a lever $r^4$, attached to the shaft $r^3$, works in a slot in one end of a rod $r^5$, the other end of which is connected to an arm $t'$ of the lever $t$, supported upon the shaft $n'$. An arm $t^2$ of this lever $t$ is connected through rods $v$ with the spindle $d$ of the movable chain-wheel $b$. To the outer end of the lever $t$ rope-pulleys $s$ are attached, and to the car a pulley $s'$ is fixed, around which pulley $s'$ and the pulleys $s$ the rope T is passed.

The brake-block B, working against the car-wheel, is attached to a lever B', suspended from the car and connected with the other brakes through rods D D' in the usual manner. Between the rods D D' a lever F is arranged, connected through rod G with a lever H, oscillating on a fixed center $p'$, attached to the car. To the lower end of this lever H a chain E is attached, passing over a guiding-roller $w$ and attached to the hub of the double wheel $o$ in the case $h$.

The rope T may be conducted to the locomotive, or to any other convenient place, to work all the brakes at the same time.

During the regular running of the cars the rope T is held taut, whereby the lever $t$ is pulled upward, the pulley $b$, through rod $v$, in connection with the arm $t^2$, is moved away from the wheel $a$, fast on the axle A, and the wheel $o^2$ is moved away from the wheel $o$ in consequence of the connection of its fork $r$, through rod $r'$, levers $r^2$ and $r^4$, and rod $r^5$, with arms $t'$ of said lever $t$. When the brake B is to be moved against the car-wheel, the rope T is loosened, when the arm $t$ will fall downward by its own weight, and its arm $t'$ will move the rod $r^5$, so as to allow the end of the lever $r^4$ to play freely in the slot at the end of the rod $r^5$, when the action of the weight $p$ upon the lever $q$ will force the wheel $o^2$ against the wheel $o$ and wheel $o'$. At the same time the wheel $b$ will be moved into gear with the wheel $a$, pulling thereby the chain $e$ taut, and thus communicating motion to the wheel $f$, worm $l$, worm-wheel $m$, and consequently to the wheels $o'$, $o$, and $o^2$. By this operation the chain E will be wound around the hub of wheel $o$, and will operate thereby, through lever H, rod G, lever F, and rod D, the brake-block B in the manner required. A slight tightening of the rope T will move the lever $t$ slightly upward, so as to move the wheel $b$ clear of the wheel $a$. On account of the slot in the rod $r^5$ the weighted lever $q$ will keep the wheels $o'$, $o$, and $o^2$ in contact, and consequently the chain E, wound upon the hub of the wheel $o$, will keep the brake-block B against the wheel as long as may be desired, or until the rope T is drawn again taut, when the wheels $o'$, $o$, and $o^2$ will be moved sufficiently apart to allow the chain E to unwind itself, and thus relieve the brake.

In Figs. 1 and 2 the casing $h$, with shaft $n$, is placed horizontal, whereby the wheels $o'$, $o$, and $o^2$ work in a vertical plane. In Figs. 3 and 4 this casing with its shaft $n$ are placed vertical, whereby the wheels $o'$, $o$, and $o^2$ work horizontally, and the chain E can be connected directly with the lever H without the necessity of the intermediate guiding-wheel $w$.

What I claim is—

1. The combination of fast wheel $a$ with the suspended swinging wheel $b$ and with chain $e$, pulley $f$, worm $l$, worm-wheel $m$, and friction-wheels $o'$ $o$ $o^2$, and with chain E, connected with the brake-operating device, substantially as specified.

2. The combination of swinging wheel $b$ with rod $v$, arm $t^2$, lever $t$, pulleys $s$ and $s'$, and rope T, as and for the purpose described.

3. The combination of wheel $o^2$ with fork $r$, rod $r'$, lever $r^2$, shaft $r^3$, and with weighted lever $q$, as and for the purpose described.

4. In combination with wheel $o^2$, fork $r$, rod $r'$, lever $r^2$, shaft $r^3$, the lever $r^4$, rod $r^5$, arm $t'$, lever $t$, pulley $s$ $s'$, and rope T, substantially as specified.

WOLFGANG SCHMID.

Witnesses:
A. JONGHMANS,
WM. WAGNER.